United States Patent
Hart et al.

(10) Patent No.: US 6,957,221 B1
(45) Date of Patent: Oct. 18, 2005

(54) METHOD FOR CAPTURING A PHYSICALLY CONSISTENT MIRRORED SNAPSHOT OF AN ONLINE DATABASE FROM A REMOTE DATABASE BACKUP SYSTEM

(75) Inventors: Donald Ralph Hart, Irvine, CA (US); Shawmo Edmund Lin, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 456 days.

(21) Appl. No.: 10/235,763

(22) Filed: Sep. 5, 2002

(51) Int. Cl.[7] ............................................. G06F 17/30
(52) U.S. Cl. ................... 707/100; 707/101; 707/104.1; 711/162
(58) Field of Search ................... 707/1, 8, 10, 100, 707/101, 104.1, 200, 201, 202, 203, 204; 711/114, 154, 162; 714/4, 6, 7, 20

(56) References Cited

U.S. PATENT DOCUMENTS

| | | | |
|---|---|---|---|
| 5,745,753 A * | 4/1998 | Mosher, Jr. ................ | 707/202 |
| 5,857,208 A * | 1/1999 | Ofek ......................... | 707/204 |
| 5,870,537 A * | 2/1999 | Kern et al. .................. | 714/6 |
| 6,029,142 A | 2/2000 | Hill | |
| 6,131,088 A | 10/2000 | Hill | |
| 6,173,377 B1 * | 1/2001 | Yanai et al. ................. | 711/162 |
| 6,332,146 B1 | 12/2001 | Jebens et al. | |
| 6,341,316 B1 | 1/2002 | Kloba et al. | |
| 6,351,749 B1 * | 2/2002 | Brown et al. ................ | 707/10 |
| 6,411,969 B1 * | 6/2002 | Tam .......................... | 707/204 |
| 6,421,717 B1 | 7/2002 | Kloba et al. | |
| 6,615,223 B1 * | 9/2003 | Shih et al. .................. | 707/201 |
| 2001/0051955 A1 * | 12/2001 | Wong ........................ | 707/201 |
| 2003/0037029 A1 * | 2/2003 | Holenstein et al. .......... | 707/1 |
| 2003/0182312 A1 * | 9/2003 | Chen et al. ................. | 707/200 |
| 2004/0098425 A1 * | 5/2004 | Wiss et al. .................. | 707/204 |

* cited by examiner

Primary Examiner—Charles Rones
Assistant Examiner—Hassan Manmoudi
(74) Attorney, Agent, or Firm—Alfred W. Kozak; Mark T. Starr; Lise A. Rode

(57) ABSTRACT

An online primary database is automatically configured to enable a physically consistent snapshot of the primary database at the secondary database to be uniquely mirrored to a secondary remote database as backup while allowing the specialized control audit images to be created at the primary database.

7 Claims, 6 Drawing Sheets

METHOD FOR CAPTURING A PHYSICALLY CONSISTENT MIRRORED SNAPSHOT OF AN ONLINE DATABASE FROM A REMOTE DATABASE BACKUP SYSTEM

FIELD OF THE INVENTION

The present invention relates to a particular system and method for capturing a snapshot of data from an online transaction processing system that is physically consistent.

CROSS-REFERENCES TO RELATED APPLICATIONS

This application is related to pending applications and an issued patent indicated below and which are incorporated herein by reference:

U.S. Ser. No. 09/951,996, entitled "Method of Capturing a Physically Consistent Mirrored Snapshot of An Online Database".

U.S. Pat. No. 6,408,310 B1, entitled "System And Method For Expediting Transfer of Sectioned Audit Files From A Primary Host To A Secondary Host".

U.S. Ser. No. 09/415,333, entitled "Tracker Sensing Method For Regulating Synchronization of Audit Files Between Primary And Secondary Hosts".

U.S. Ser. No. 09/177,175, entitled "System And Method For Reading Audit Data From Remote Mirrored Disk For Application To Remote Database Backup Copy".

BACKGROUND OF THE INVENTION

The present invention generally relates to a method to capture a physically consistent snapshot of data that is from an Online Transaction Processing system. The online transaction processing system is derived from a remote database backup system, which is maintained by (i) transferring a package of audit data from a primary database system to a remote system process; (ii) then writing the audit data to a remote disk; (iii) then applying the audited changes to the remote database backup copy. When a network communication error occurs during the first step (i) involving transferring a package of audit data from a primary database to a remote system process, then, the primary database system activity is temporarily suspended as a QUIESCE point.

The process of suspending database update activity is counterproductive to the goal of maintaining 24×7×365 database update availability and thus constitutes a problem. In this regard, if a physically consistent database "copy" could be created from an online remote database system, then production database availability for updates will be improved while system performance is also improved when a remote physically mirrored snapshot is used to offload processing.

In order to accomplish the physically consistent snapshot just described, a database system process, or "QUIESCE" operation, according to the present invention, consists of a database utility command that communicates a "QUIESCE" request to an online remote database whereby a series of processes are initiated which allows "Read" access to the secondary host database copy.

When the QUIESCE command is issued to a remote database backup system, the results are as follows: (1) the utility program DMUTILITY that issues the QUIESCE command calls a RDB Support Library procedure at the remote host which sends a message to the primary host Accessroutines program via a network transmission, (2) the primary host Accessroutines waits for all active/update transactions to complete, (3) future transactions are suspended on the primary host database, (4) data and audit buffers of the primary host database are written to disk, (5) the primary host Accessroutines writes two specialized "control points" to the audit file, (6) primary host database update activity is automatically resumed, (7) the audit blocks containing the two specialized control points are sent to the secondary host via the Remote Database Backup audit transfer mechanism, (8) the secondary host Tracker Task reads the two specialized control points from the audit trail, (9) the secondary host Tracker Task writes all data buffers to disk, (10) the QUIESCE status and QUIESCE TIMESTAMP—captured from the specialized control points—are written to the control file at the secondary host, (11) the database utility program completes with the message "DATABASE QUIESCED," (12) the secondary host Tracker Task is suspended while read access is allowed to the secondary host database copy until a database utility RESUME command is entered at the secondary host.

One prior art method to which the method of the present invention generally relates is described in U.S. Pat. No. 6,421,717, entitled "System, Method, And Computer Program Product For Customizing Channels, Content, And Data For Mobile Devices". This prior art method includes systems, methods, computer program products, and combinations and sub-combinations thereof, for enabling web content (as well as other objects) to be loaded on mobile devices (as well as other types of devices), and for users of mobile devices to operate with such web content on their mobile devices in an interactive manner while in an off-line mode.

The present invention differs from the above prior cited art in that the present invention focuses on capturing a physically consistent snapshot of data that is from an Online Transaction Processing system, while guaranteeing logical and physical consistency of data snapshots. Unlike the prior art method, the present invention supplies "remote" methods that involve remote disk configuration, and therefore, no additional disk configuration is required at the primary host. The method of the present invention provides a function to read the timestamp value from the specialized control point audit record, and store this value into the QUIESCE TIMESTAMP location of the database control file at a secondary host.

Yet another prior art method to which the method of the present invention generally relates is described in U.S. Pat. No. 6,341,316 entitled "System, Method, And Computer Program Product For Synchronizing Content Between A Server And A Client Based On State Information". This prior art method includes systems, methods, computer program products, and combinations and sub-combinations thereof, for enabling web content (as well as other objects) to be loaded on mobile devices (as well as other types of devices), and for users of mobile devices to operate with such web content on their mobile devices in an interactive manner while in an off-line mode.

The present invention differs from the above prior cited art in that the present invention focuses on capturing a physically consistent snapshot of data that is from an Online Transaction Processing system, while guaranteeing logical and physical consistency of data snapshots. Unlike the prior art method, the present invention supplies "remote" methods that involve remote disk configuration, and therefore, no additional disk configuration is required at the primary host.

Yet another prior art method to which the method of the present invention generally relates is described in U.S. Pat.

No. 6,332,146 entitled "Method And Apparatus For Storing And Printing Digital Images". This prior art method involves a digital data management and order delivery system. The system includes a storage device for storing digital data and a searching engine for developing a subset of the digital data stored in the storage device in response to inputs received from a first user. The system is also provided with a job order developer responsive to inputs received from the first user for developing a job order which includes: a) at least one copy of the digital data contained in the subset and identified by the first user; and b) a file containing information developed by the first user outside the system. In addition, the system includes a router for electronically routing the job order compiled by the job order developer to a second user specified by the first user.

The present invention differs from the above cited art in that this method of the prior art teaches methods that control the storage of data from a database module. The method of the present invention contrarily solves the problem of capturing a copy of data, which is both physically and logically consistent while the methods taught by the above patent teaches methods to capture data (or objects) without any regard to physical and logical consistency.

Yet another prior art method to which the method of the present invention generally relates is described in U.S. Pat. No. 6,131,088 entitled "Electronic Catalog System And Method". This prior art method is a method for accessing product information data and detecting pirated copies of a serialized software program. This includes transmitting a data request query related to a selected product from a remote computer to a main computer, identifying a subset of product data related to the selected product stored in the memory of the main computer based on the data request query, transmitting textual data from the subset of product data from the main computer to the remote computer, transmitting only updated graphics data from the main computer to the remote computer, and combining the textual data received from the main computer with graphics data stored in the memory of the remote computer to provide complete product information data related to the selected product. These methods also include storing a program serial number, the remote revision level corresponding to the program serial number, and a validation code for a remote program corresponding to the serial number. The methods detect whether the program stored in the remote memory is valid or invalid based upon the validation code corresponding to the program serial number.

The present invention differs from the above prior art in that the method of the present invention provides a feature of using a Remote Database Backup audit trail (a.k.a. transaction log) to determine a point of database consistency, and of capturing a physically consistent mirrored snapshot of an online database from a remote database backup system.

Yet another prior art method to which the method of the present invention generally relates is described in U.S. Pat. No. 6,029,142 entitled "Electronic Catalog System And Method". This prior art method is an apparatus and method provided for displaying product information data related to at least one product. The method includes the steps of transmitting a data request from the remote computer to the main computer, transmitting the variable data and display information from the main computer to tie remote computer, transmitting updated constant data from the main computer to the remote computer, and storing the updated constant data in the memory of the remote computer. The method also includes the steps of integrating constant data stored in the memory of the remote computer with the variable data received from the main computer and using the display information received from the main computer to format the constant data and the variable data to generate the product information data related to the product, and displaying the product information data generated by the remote computer during the integrating step on a monitor coupled to the remote computer.

The present invention differs from the above prior art in that the method of the present invention provides functions and purposes which the method of the prior art does not. The method of the present invention provides a function to suspend the remote audit application process (a.k.a. Tracker) after two requested "control points" are read from the audit trail whereby physical consistency is achieved through the flushing of data memory buffers to disk. The method of the present invention also provides a function to send a network message from a secondary host to a primary host database to request the two specialized control points.

SUMMARY OF THE INVENTION

It is therefore an object of the present invention to realize the increase in database system availability by remotely creating physically consistent mirrored snapshot of an online remote database copy.

Still another object of the present invention is to enable offload processing when a remote mirrored snapshot is made available.

Still another object of the present invention is to improve database availability for updated information and enhance system performance.

Still another object of the present invention is to offload the database activity during such operations as backup, certification, and data warehousing.

Still another object of the present invention is to increase primary database update availability while database systems at both hosts primary and secondary hosts remain online through the entire process.

These objects are accomplished by means of momentarily "QUIESCING" a primary database to flush audit data to a primary disk database (D1) while also transmitting the audit data to a secondary backup system (D2). A Tracker Task program in the secondary database updates the secondary backup database during a secondary "QUIESCE period" to make the secondary backup database disk D2(25) show consistency with the primary database D1 (16). A disk mirroring system (26) is used to copy database data from D2 (25) onto an auxiliary database disk D3 (23) which is now available for extra backup, certification and data warehousing. As a result, there is no need to suspend the primary database system from update activity and further, both primary and secondary hosts remain operable and online for transaction handling.

Still other objects, features and advantages of the present invention will become readily apparent to those skilled in the art from the following detailed description, wherein is shown and described by the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative, in nature, and not as restrictive and what is intended to be protected by Letters Patent is set forth in the appended claims. The present

GLOSSARY ITEMS

Figure 1:
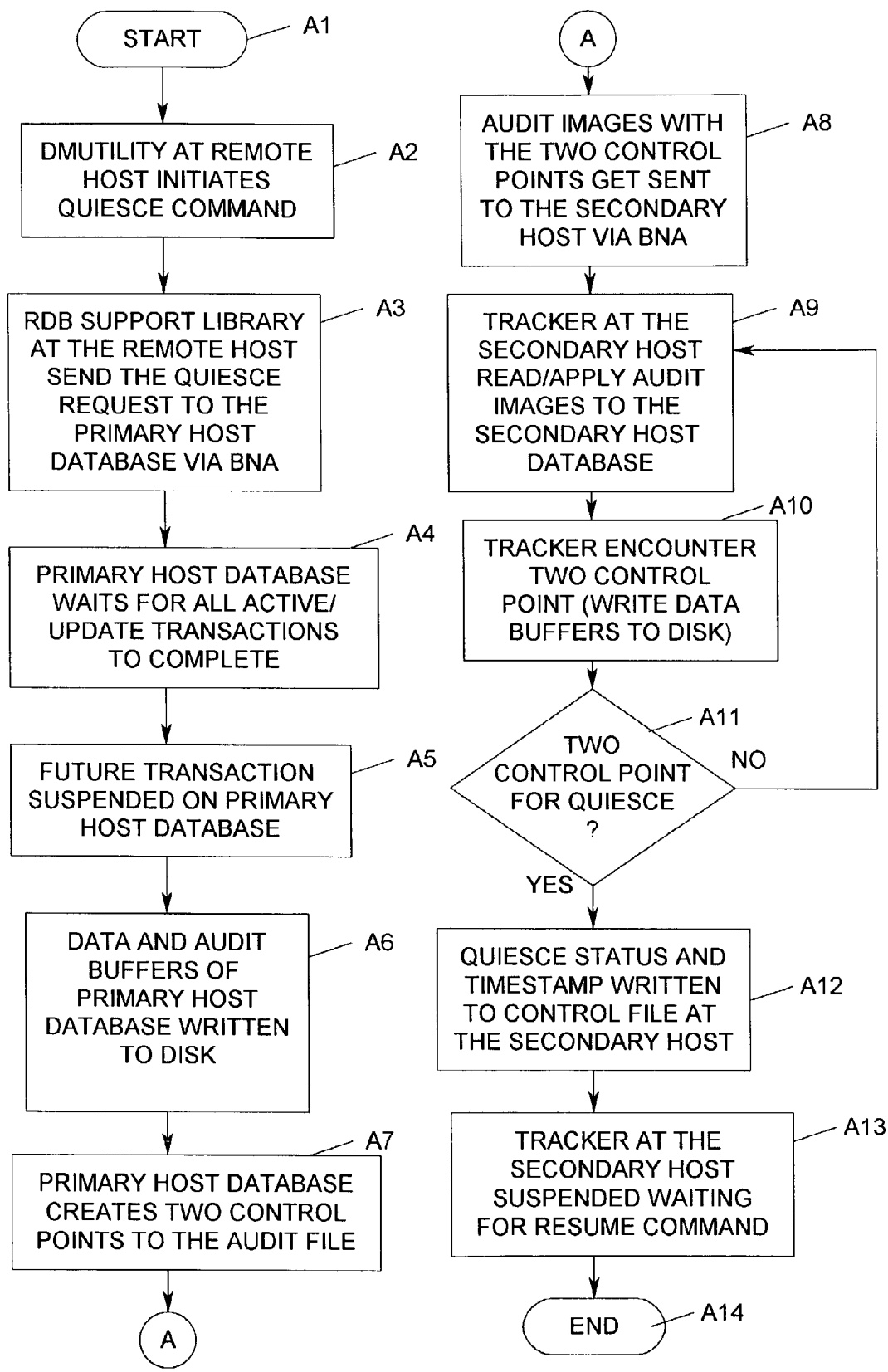
FIG. 1 is a flowchart illustrating the steps of the process to capture a physically consistent mirrored snapshot of an online database from a remote database backup system.

1. ACCESSROUTINES: The software component of DMSII product that is primarily responsible for the accessing (creating, modifying and deleting) of data in a DMSII database. The Accessroutines is also responsible for auditing all changes to the database.
2. ACR: See Accessroutines.
3. ACTIVE TRANSACTIONS COMPLETED: See QUIET POINT.
4. ADMINISTRATIVE OPTIONS: In an RDB system, user-interface options that initiate administrative tasks.
5. APPLICATION DEVELOPMENT: The activity of writing and testing database applications.
6. APPLICATION TRANSACTION STATE: The condition every update program of an audited database must enter in order to perform any data record update statements (e.g., STORE, DELETE, etc.).
7. AUDIT BLOCK: A structured package containing potentially many Audit Records (in the extreme situation, it is also possible that a single Audit Block could contain a partial Audit Record). There are a number of control words at the beginning and end of each Audit Block. Classically, the maximum size of an audit block is specified in the DASDL for each individual database; with the Extended Edition, it is possible for the ACR to extend this size dynamically. The size of an audit block is "rounded up" to fit into an integral number of disk sectors; it could occupy as few as 1 sector or (in the extreme) as many sectors as are in a disk row (specified in the DASDL via AreaSize).
8. AUDIT BUFFER: A system memory buffer maintained by the DMSII software into which an audit block is placed for ACCESSROUTINES access.
9. AUDIT FILE: Logically considered to be the sequential storage of Audit Records. Actually, the sequential storage of Audit Blocks which contain the Audit Records.
10. AUDIT RECORD: A structured package of data built somewhere within the ACR and stored (sequentially) into the Audit File. Header and trailer words of the record contain, among other things, the length and type of record.
11. AUDIT SECTION: With the Extended Edition, multiple MCP disk files can be used to physically implement a single Audit File. Each of these disk files is referred to as a Section of the Audit File. The sequence of Audit Blocks is spread, round robin fashion, among the multiple Audit Sections.
12. AUDIT TRAIL: The sequence of Audit Files that are created that span the life of the database. Each Audit File is assigned an Audit File Number (AFN) starting at 1 when the database is created and incremented by one when each new Audit File is created. An Audit File may be Sectioned or not. The individual Sections of an Audit File all share the same AFN value, although they each have a unique section number within their Audit File.
13. AUDIT TRANSFER: In an RDB (Remote Database Backup) system, a method of transmitting audit images from the source host to the target host.
14. AUDITED CONTROL POINTS: See CONTROL POINTS.
15. BACKUP: A copy of the database files stored on magnetic tape or disk storage.
16. BCV: EMC provides the ability to create a duplicate of a disk which can then be processed independently of the original disk. The duplicate is called a Business Continuation Volume (BCV). A BCV contains a mirror image of an active production volume. The BCV can be separated from the production volume, allowing separate tasks to operate on independent data images.
17. BI: Business Initiative.
18. BNA NETWORK: The network architecture used on ClearPath Enterprise Servers to connect multiple, independent, compatible computer systems into a network for distributed processing and resource sharing.
19. CERTIFICATION: The process of verifying the physical consistency of a database or portion of a database.
20. CONFIGURATION OPTIONS: In an RDB (Remote Database Backup) system, user-interface options that initiate configuration tasks.
21. CONTROL POINT: A logical construct within the e-@ction Enterprise Database Server used to limit the number of audit records which must be reprocessed in the event of a system failure. Data buffers which have been modified are guaranteed to be written to disk at least once every two control points, thus halt/load recovery need only process changes since the second to last control point in an audit trail. Control Points occur on a user-specified frequency defined in SYNC points.
22. CSC: Customer Support Center. The Unisys organization tasked with answering customer questions and problem resolution. CSC is the first line of support for customers after consultation with any on-site representatives.
23. DASDL: Data And Structure Definition Language. The language used to specify the structure and specific software configuration for a database.
24. DATABASE ANALYSIS: The process of analyzing the physical structure of database files.
25. DATABASE AVAILABILITY: The availability of data files within a database system.
26. DATABASE CONTROL FILE: A special file required by the DMSII software on all databases. System-level information is stored in the control file which the ACCESSROUTINES use to manage the database. The control file also provides a place for exclusive users of the database, such as DMUTILITY to mark the database as unavailable.
27. DATABASE EXTRACTIONS: Data that is read from a database.

28. DATABASE INTEGRITY TESTING: The process of testing the physical consistency of data files within a database.
29. DATABASE PROCESSING: Database processing in a mirrored disk environment.
30. DATABUFFER: A system memory buffer maintained by the DMSII software into which a data block is placed for ACCESSROUTINES access.
31. DATA SET: A disk file (potentially, a group of disk files) containing data records all in a similar format. An e-@ction Enterprise Database Server structure type declared in DASDL.
32. DATA WAREHOUSING: A copy of data specifically structured for querying and reporting.
33. DBA: DataBase Administrator. The person within an organization who is responsible for the development, maintenance, and security of databases.
34. DISASTER RECOVERY: The recovery of any event that creates an inability for an organization to provide critical business functions for some predetermined period of time.
35. DISK ROW: The minimum allocation of disk space via the MCP. A disk file is composed of a sequence of disk rows that may occupy arbitrary locations on the disk media. Within a disk row, all blocks are allocated at sequential disk addresses.
36. DMSII: Unisys Data Management System II. The comprehensive, primary database management software package in use on Unisys A Series family of mainframe computers.
37. DM UTILITY COMMANDS: Commands used to manage a physical database. These are described in a Unisys Corporation Publication, 8600-0759-606 (November 2001) entitled "Unisys e-@ction Enterprise Database Server For ClearPath MCP Utilities Operations Guide".
38. EMC: A global enterprise storage company.
39. EMC SRDF: See SYMMETRIX REMOTE DATA FACILITY.
40. EMC TIMEFINDER: A business continuance solution which allows customers to use special devices that contain a copy of Symmetrix devices from an attached host(s) while the standard Symmetrix devices are on-line for regular I/O operation from their host(s).
41. FLUSHING TO DISK: The process of writing system memory buffers (data and/or audit) to disk.
42. FUTURE TRANSACTIONS SUSPENDED: The process of preventing database applications from entering a transaction state.
43. HMP: Heterogeneous Multi-Processor.
44. INTEGRATION TEST: The act of combining individual units and components, and then testing them to ensure that the individual units and components still function as expected.
45. LOGICALLY CONSISTENT DATABASE: An online database whose consistency is maintained by data buffers and physical data files.
46. MARC: Menu Assisted Resource Control. A menu-based interface to Unisys A Series systems for the purpose of entering system commands.
47. MCP/AS: Unisys Master Control Program/Advanced Systems. The comprehensive virtual memory operating system which drives the Unisys A Series family of hardware.
48. MCP ENTERPRISE SERVER REMOTE DATABASE: In an RDB (Remote Database Backup) system, the database copy that resides at the remote host.
49. MCP TO RDB DATABASE OPERATIONS CENTER GUI: The complete set of Remote Database Backup Operations (Configuration, Administrative, and Monitoring) contained within the Database Operations Center graphical user interface.
50. MIRROR FAMILY: One or more physical disks that share a family name and contain mirrored images of all data from a source family of disks.
51. MIRRORED AUDIT TRANSFER: In an RDB system, a method of audit transfer where target audit data is available on a mirrored family of disks.
52. MIRRORED COPY: See MIRROR FAMILY.
53. MIRRORED DATA TRANSFER: A method of maintaining a mirrored family of disks containing data files.
54. MIRRORED DISK: A disk which is a mirror image of its source disk (e.g. Family Name, Serial number and capacity are identical).
55. MIRRORED SNAPSHOT: A mirrored copy that is split from its source.
56. MONITORING OPTIONS: In an RDB system, user interface options that initiate the monitoring of audit generation and audit transfer activities.
57. OFFLINE DATABASE SYSTEM: A database system that is in a state of inactivity whereby no data files are being accessed.
58. OFFLOAD PROCESSING: The process of dividing database access activities by creating one or more copies of a database.
59. ONLINE IN DATABASE SYSTEM: A database system that is in a state of activity whereby data files are being accessed and/or modified.
60. PDS: Product Definition System: The Unisys internal system containing ordering and configuration information for all Unisys products.
61. PHYSICALLY CONSISTENT DATABASE: A database whose consistency is established when no applications are in a transaction state and all data buffers are flushed to disk.
62. POINT-IN-TIME SNAPSHOT: A mirrored snapshot that is split at a specific point in time.
63. QUIESCE DATABASE: A database that is in a physically consistent state.
64. QUIET POINT: Location in the Audit trail where no program is in transaction state.
65. RDB: Remote Database Backup. A Unisys product which provides real-time backup services for DMSII database as part of a disaster recovery plan. Remote Database Backup is suitable for use with A Series Databases.
66. REAL TIME REMOTE DATABASE ACCESS: Access to a remote database copy while the copy is kept current with its source.
67. REGRESSION TEST: A representative subset of functionality tests to ensure stability and accuracy following the insertion or modification of code.
68. REMOTE COPY AUDIT: The activity of backing up a remote audit file that is a copy of its source.
69. SAN: Storage Area Network.
70. SAN MIRROR DISK MANAGER: A Unisys Corporation ClearPath system software feature that makes it possible to split off a copy of a disk family within the same MCP environment as the source volumes, regardless of the type of disk.
71. SCHEDULED BACKUP: A backup that is scheduled to be performed at a predetermined time.
72. SINGLE HOST BACKUP: A backup that occurs at the same host as its database source.

73. SNAPSHOT COPY: The term "snapshot copy" is used to identify a copy of an MCP family which has been provided unique identification. This allows the "snapshot copy" to coexist within the same MCP environment as its original.
74. SOURCE COPY: In a mirrored database environment, the database copy that is mirrored to a target.
75. SPLIT MIRRORS: Target mirrored disk copies that are split from their original (source).
76. SSR: System Software Release. A package of system software and related documentation that is periodically released to the field for A Series computer systems.
77. STORE SAFE: A storage software feature that enables a site to ensure that multiple copies (mirrors) of disk data are coherent.
78. STORE SAFE MEMBER: A member of a mirrored set that has been assigned a store safe name.
79. SYMMETRIX: EMC corporation's enterprise storage system.
80. SYMMETRIX I: In an SRDF environment, the disk storage subsystem that represents the source.
81. SYMMETRIX II: In an SRDF environment, the disk storage subsystem that represents the target.
82. SYMMETRIX REMOTE DATA FACILITY (SRDF): EMC's disk-mirroring software solution for use with Symmetrix hardware.
83. SYNC POINT: A quiet point (in the audit trail) that is forced to occur every "n" transactions; Audit buffers are flushed.
84. TRACKER: An asynchronous RDB task declared and processed from Accessroutines. It's function is to rebuild the database.
85. UCF: User Communication Form. A form used by Unisys customer to report problems and express comments about Unisys products to support organizations.
86. VDBS: Visible DataBase Stack. A set of commands which are issued directly to a database stack to interrogate or change some aspect of the database configuration.
87. AUDIT DATA: For DMSII databases, data that records every change to a predefined database.
88. PARTITIONED AUDIT FILE: For DMSII databases, a logical audit file that is partitioned into a predefined number of physical files.
89. AUDIT FILE: For DMSII databases, a file produced by the Accessroutines that contains various control information, including before and after images of records resulting from changes to the database.
90. SOURCE DATABASE HOST: In an RDB system, the host that contains the primary copy of the database.
91. RESYNCHRONIZATION MODE: Under the ABW audit file transmission mode of an RDB database, the process of bringing the audit trail of the secondary database back into the closest possible synchronization with the audit trail of the primary database.
92. TARGET HOST: In an RDB system, the host that contains the remote copy of the database.
93. REMOTE DATABASE BACKUP: A disaster recovery capability for DMSII-based databases that enables the replication of an audited (primary) database on a secondary host. The replicated (secondary) database is kept up-to-date with the primary database through the application of audits from the primary database. When the primary database becomes unavailable, the secondary database can take over the role of the primary database.
94. LOGICAL AUDIT BLOCK: For DMSII databases, a structured package containing potentially many Audit Records (in the extreme situation, it is also possible that a single Audit Block could only contain a partial Audit Record).
95. LOGICAL AUDIT FILE: For DMSII databases, the sequential storage of Audit Blocks that contain Audit Records. One Logical Audit File may contain 1 or more Physical Audit Files (Sections or Partitions). The sequence of Audit Blocks is spread, round robin fashion, among the Audit Sections.
96. PHYSICAL AUDIT FILE: A physical file containing Audit Blocks. May be 1 of many sections of a Logical Audit File.
97. PORT FILE NETWORK COMMUNICTION: In an RDB system, the method of messaging and data transfer between a source database system and a remote backup system.
98. REMOTE HOST: In an RDB system, the host that contains the duplicate copy of the source database. Also known as the Secondary Host.
99. SYNCHRONIZATION OF THE AUDIT TRAILS: In an RDB system, the process of keeping the audit trail at the remote host synchronized with the audit trail at the source host.
100. FASTER AUDIT GENERATION: For DMSII databases, a rate of audit generation that can be achieved by using sectioned audit and multiple processors.
101. ORIGINAL AUDIT TRAIL: In an RDB system, the audit trail of the source database.
102. NON-PARTITIONED AUDIT FILE: In a DMSII system, and audit file that has 1 section or partition. Equally, an audit file that contains one physical file.
103. LOGICAL RESYNCHRONIZATION PROCESS (CATCHUP): In an RDB system, the mode of resynchronizing the primary and secondary audit trails following a network failure during normal audit transfer.
104. SHARED DATABASE TASK: For DMSII databases, the running process accessed by all database applications to read and write data to the database and audit trail.
105. CATCHUP TASK: In an RDB system, a physical process that runs at a remote host, reads audit data from a port file connected to a source database, and writes the data to a physical audit file section.
106. SERVER TASK: In an RDB system, a task that is connected to a remote host for messaging and data transfer.
107. RDBSUPPORT LIBRARY: In an RDB system, the library that is accessed by the shared database task, database utilities, and additional applications responsible for configuring an RDB system. The library is also a running process responsible for initiating local and remote tasks through port file communication.
108. PARALLEL BUFFERS: Any number of storage areas each of the same size.
109. SYNCHRONIZATION OF SOURCE AUDIT TRAIL WITH REMOTE AUDIT TRAIL: Same as SYNCHRONIZATION OF THE AUDIT TRAILS.
110. NORMAL AUDIT TRANSFER: In an RDB system, the uninterrupted transfer of audit data from a source database host to a remote host while the source database is being updated.
111. SQL (STRUCTURED QUERY LANGUAGE): A standardized language for defining, querying, maintaining, and protecting the contents of a relational database.
112. SQL-DATABASE: A relational database made up of tables and views.

113. SEMANTIC INFORMATION MANAGER (SIM): A database management system that simplifies he task of modeling your application environment based on the semantic data model.

114. SIM-DATABASE: A DMSII database defined by SIM.

115. LOGIC & INFORMATION NETWORK COMPILER (LINC): A software development tool that may be used to generate a DMSII database and any number of applications to access the database.

116. LINCII DATABASE: A database generated by the LINC system software; may be a DMSII database.

117. RDB UTILITY: The menu-driven user interface for defining, installing, and maintaining an RDB system.

118. AUDIT FILE SWITCH: For DMSII databases, the logical time when one audit file is complete and a new one is started.

119. SYNCHRONIZATION (PRESENT CONTEXT): In an RDB system, the process of updating a remote audit trail to replicate the source audit trail.

120. PERIODIC SYNCHRONIZATION: In an RDB system, audit synchronization that takes place only when complete audit files become available for transfer to a remote host (i.e. following an audit file switch.)

121. SYNCHRONIZATION-NEAR REAL TIME: In an RDB system, the level of synchronization achieved when each audit block is transferred to the remote host immediately after it is written at the source host.

122. SYNCHRONIZATION-WITHIN ONE COMPLETE AUDIT FILE: In an RDB system, the level of synchronization achieved when an audit file is transferred to the remote host immediately following an audit file switch at the source host.

123. AUDIT IMAGES: For DMSII databases, structured package of data representing changes to the database that are stored sequentially into the audit trail.

124. SYNCHRONIZED AUDIT TRAILS: In an RDB system, audit trails at a source and remote host that are exact duplicates.

125. SYNCHRONIZATION LEVEL: In an RDB system, the level at which the remote audit trail is kept current as a replicate of the source audit.

126. SECTIONED AUDIT FILES: Same as PARTITIONED AUDIT FILES.

127. NON-SECTIONED AUDIT FILES: Same as NON-PARTITIONED AUDIT FILES.

128. AUDIT FILE VS. AUDIT BLOCK: For DMSII databases, the audit file represents one or more physical files that contain audit blocks that are stored sequentially.

129. TAKEOVER: In an RDB system, the process that enables the remote database to assume the role of the source database.

130. CATCHUP: In an RDB system, the process that brings the remote audit trail back into synchronization with the source audit trail following a suspension of normal audit transfer.

131. PACKET (OF AUDIT DATA): For DMSII databases, a collection of one or more audit blocks.

132. AUDIT TRAIL: For DMSII databases, the sequence of audit files that are created and span the life of the database.

133. ACR: Abbreviation for Accessroutines, the software component of the DMSII product that is primarily responsible for the accessing (creating, modifying and deleting) of data in a DMSII database and auditing all changes to the database.

134. ACR SERVER: In an RDB system, a task that is initiated remotely at either host to communicate between hosts.

Notes:
EMC=TM of EMC Corp.
Symmetrix is a copyright of EMC.
SRDF=TM of EMC.
ClearPath=TM of Unisys.
Windows NT-Copyright of Microsoft.

General Overview:

The present invention involves a method of capturing a physically consistent snapshot of an online database system from a remote database backup system. In normal practice, a logically consistent database is maintained for the "on-line" database system, by reading data from the physical disk storage and then temporarily storing the data in an active memory storage. During operations however, the data stored in memory can undergo many changes that are activated by the on-line database applications. However, these changes result in a database that is not physically consistent during the period while the database system still remains on-line and operative.

In general practice, the only method of securing a physically consistent database was to take the operating database system off-line in order to make a second copy of the database, which would be consistent with the present state of the formerly on-line database.

It should be indicated that mirrored disk environments have been found to be very helpful in this situation. The physical consistency of a primary database and a secondary database is desirable by use of a mirrored-disk environment, whereby the mirrored copies can be split from their original source.

The mirrored copies then represent point-in-time snapshots of a physically consistent database, that is to say, that the mirrored copies are duplicative of the formerly on-line database, thus to form a physically consistent database situation.

Thus, now it is advantageous to be able to use an additional duplicative database copy for informational access without disturbing the secondary database copy for informational access and also without disturbing the ongoing operations whereby users can utilize the local primary host while other users can utilize the remote secondary host. Now, online transaction operations can continue both at the local site and at the remote site allowing a significantly greater number of transactions to be handled per unit time.

DESCRIPTION OF PREFERRED EMBODIMENT

FIG. 1 is a flowchart diagram for managing the process of capturing a physically consistent mirrored snapshot of an "online" database from a remote database backup system. This diagram begins with start bubble A1, and proceeds to a process block A2 where a DMUTILITY program at remote host (18, FIG. 2) initiates a QUIESCE command. Block A2 is described in further detail in FIG. 3. Then, an RDB support library at the remote host sends the QUIESCE request to the primary host database via BNA 17 at block A3. The process described at block A3 is similar to processes described in a previously filed patent application, U.S. Ser. No. 09/415,333 which issued on Sep. 30, 2002 as U.S. Pat. No. 6,446,090.

Another process step A4 follows in which the primary host database 14 waits for all active/update transactions to complete. Next, future transactions get suspended on the primary host database (block A5). The data and audit buffers of the primary host database are then written to disks 15 and 16 (FIG. 2) at block A6. Next, the primary host database 14 creates two control points (FIG. 4) to the audit file at block A7. The processes described at blocks A4–A7 are also described in further detail in a previously filed patent application, U.S. Ser. No. 09/951,996 which issued on Apr. 5, 2005 as U.S. Pat. No. 6,877,016.

Figure 3:
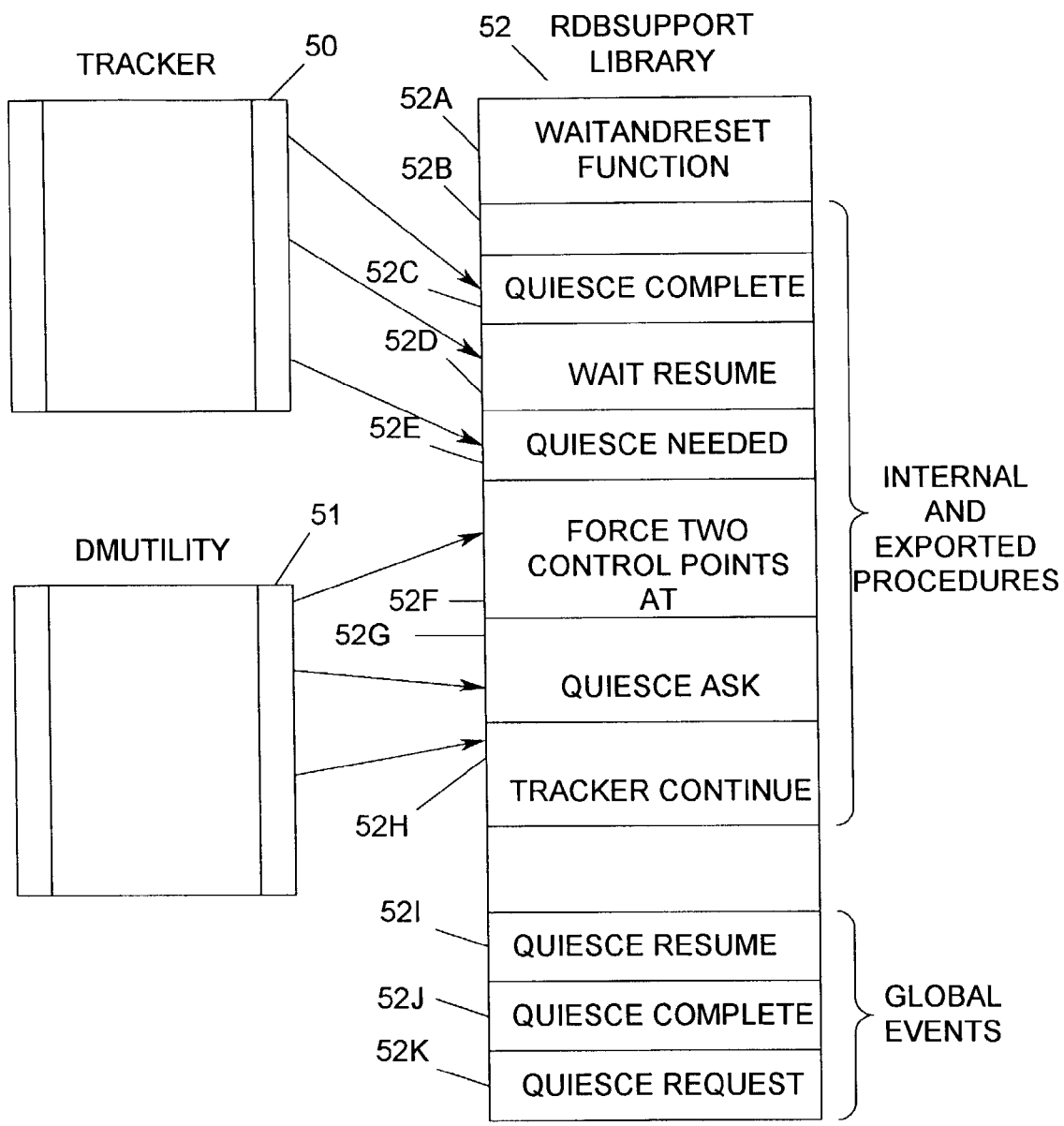
FIG. 3 is a drawing illustrating the use of a tracker program and a utility program between the internal and exported procedures of the RDB Support library.

This is followed by another sequence to audit images with the two control points being sent to the secondary host 18 via BNA 17 or other audit transfer mechanism at block step A8. The process at block A8 is described further in U.S. Pat. No. 6,408,310. Next, the Tracker at the secondary host 18 reads/applies audit images to the secondary host database 22 at block A9, which then allows the Tracker to encounter two control points (write data buffers to disk) at block A10. The Tracker is shown in FIG. 3 of U.S. Pat. No. 6,408,310. Then, an inquiry step A11 is made as to whether or not there are two control points for QUIESCE. If the answer to inquiry A11 is no, the Tracker at the secondary host reads/applies audit images to the secondary host database at block A9, which then continues through the process. If the answer to inquiry A11 is yes, the QUIESCE status and Timestamp are written to a control file at the secondary host 18, (block A12). The process described from steps A9 through A11 are further described in FIG. 3 herein. Next, the Tracker at the secondary host 18 is suspended while waiting for the "Resume" command (block A13). The process blocks at A12 and A13 are further described in a previously filed patent application (U.S. Ser. No. 09/951,996) which issued on Apr. 5, 2005 as U.S. Pat. No. 6,877,016. The entire process then ends at bubble A14.

Figure 2:
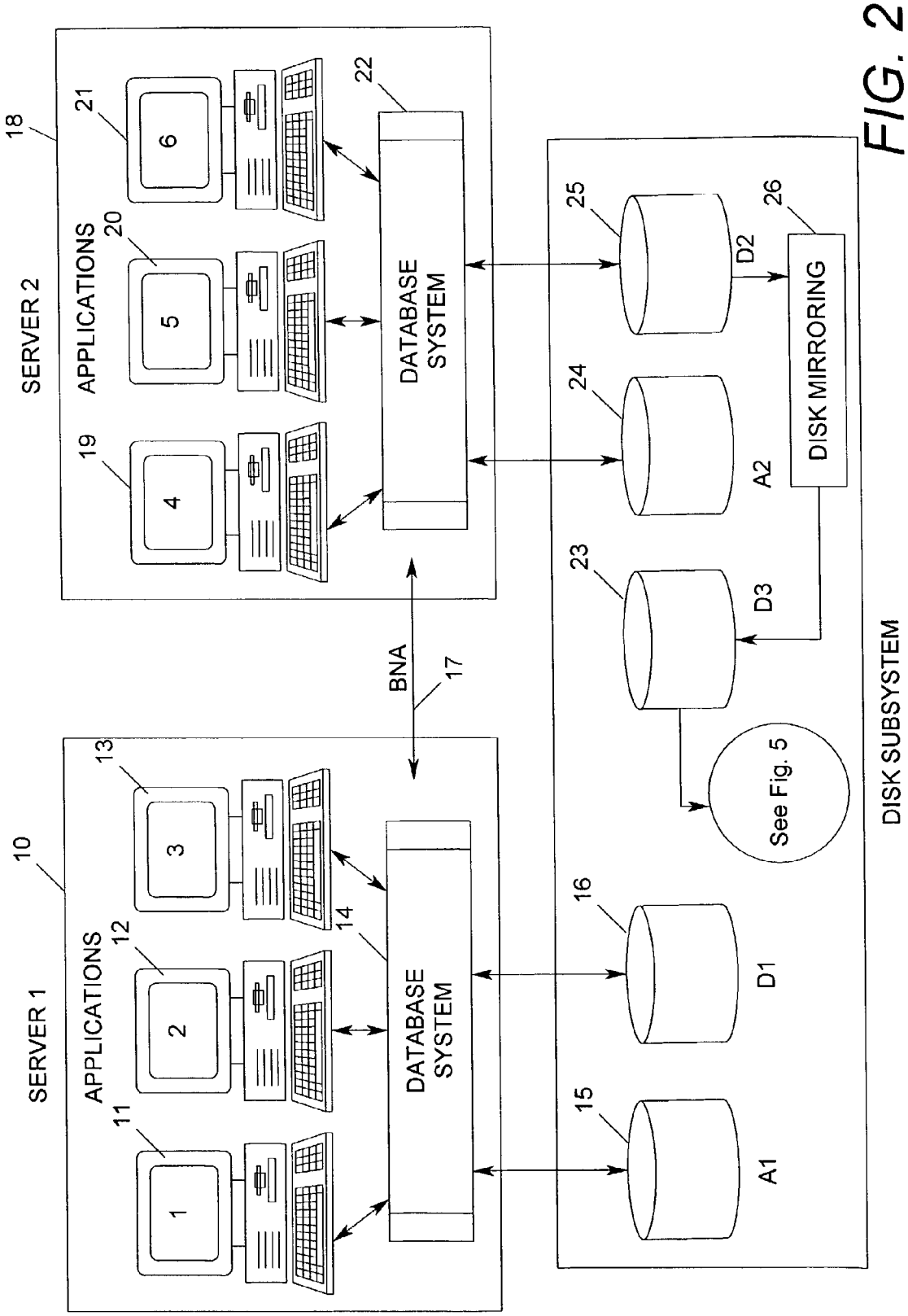
FIG. 2 is a drawing of the system showing a primary host-server, secondary host-server and a disk subsystem supporting the primary and secondary servers.

FIG. 2 is a diagram of a remote database backup (RDB) system environment. The main primary server 10, such as ClearPath NX server is used to run several different applications and utilizes the personal computer client-users 11, 12, and 13, which interact with and access the primary database 14. The applications labeled 11, 12 are read/write applications, whereas 13 is a read only application.

The secondary server 18 contains applications available to the secondary client-users, which interact with and access the secondary database system 22. The applications labeled 19 and 20 are read only applications, whereas 21 is a DMUTILITY, program which can export a command "QUIESCE".

Both the primary and secondary database systems have one means 17 of communicating with each other. They can communicate via a network channel BNA 17 shown in FIG. 2.

In the primary server system 10, the disk 16 contains data files written to and read by the database system at the primary server 10. The data files contained on disk 16 are sent back and forth between disk 16 and the database system 14. The audit files at disk 15 are also sent back and forth between disk 15 and the primary database system 14.

In the secondary remote server host 18, disk volume 23 contains a physically mirrored copy of disk volume 25, which contains data files written to and read by the secondary database system 22. Disk volume 24 is a physical copy of disk volume 15 from the Database system 14 of the primary server 10. The data files are passed through the BNA 17 network channel, which allows communication between the primary 14 and secondary 22 database systems.

The disk mirroring system 26 of FIG. 2 could, for example, be a product of the EMC Corporation of Hopkinton, Mass., as represented in the U.S. Pat. No. 5,742,792 to Moshe Yanai, et al. Thus, two data storage systems are interconnected by a data link for mirroring of data.

In the present embodiment utilized herein, each volume of local primary data is configured as a local audit data (A2) on disk 24 and local database information (D2) on disk 25. The source audit data on disk 25 is connected via the disk mirroring system 26 to a target disk volume 23 (D3).

Figure 6:
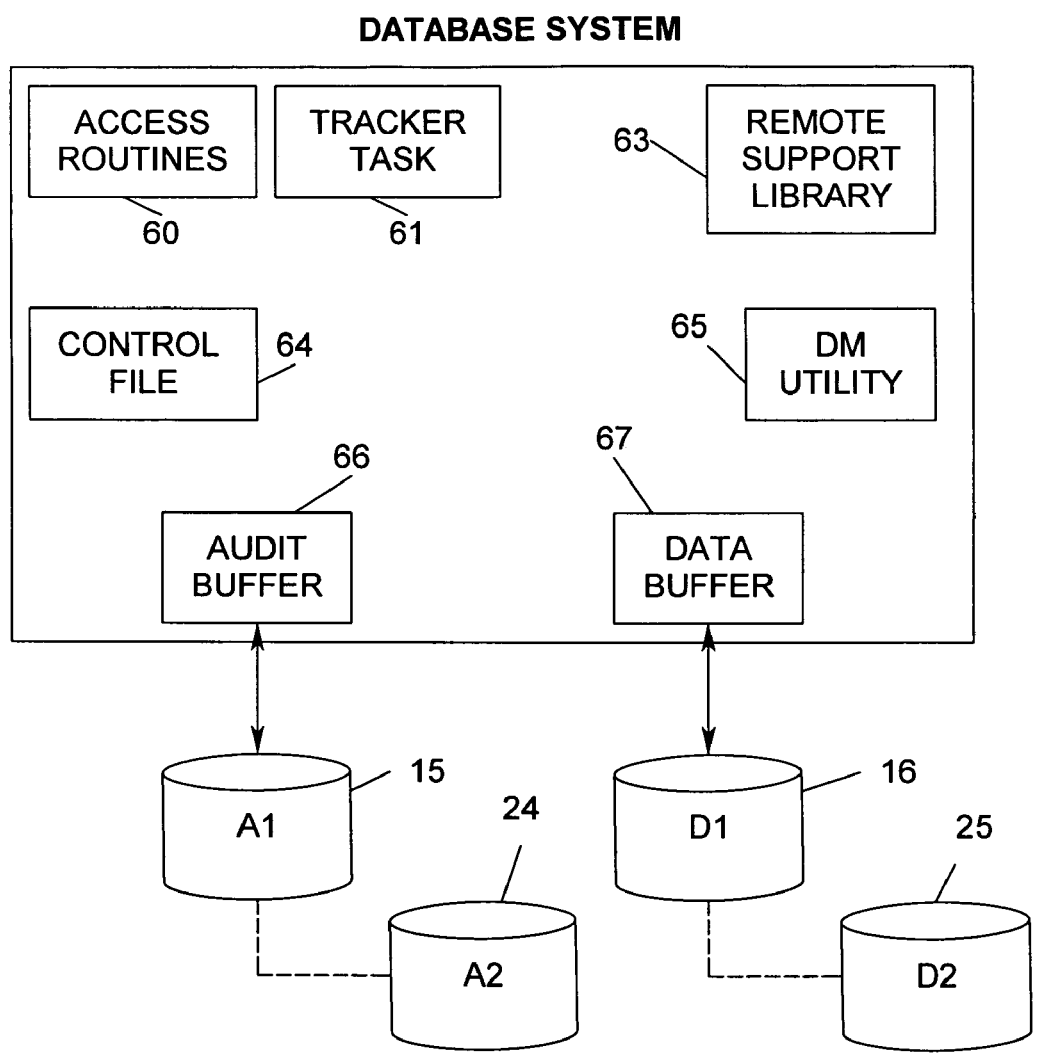
FIG. 6 is a drawing which indicates the components utilized in database systems of the primary and secondary servers of FIG. 2.

Each of the primary (14) and secondary (22) database systems of FIG. 2 are provided with a set of operating components which are indicated in FIG. 6.

These components include (i) Accessroutines 60 for creating, modifying and deleting data; (ii) the Remote Support Library (63) for initiating certain tasks (iii) the Tracker Task (61) for sensing when a specified level of out-of-synchronism has occurred between the primary and secondary databases; (iv) a DMUTILITY program (65) for providing management to a database including when to initiate a QUIESCE to a database; (v) a Control File (64) to record status of a QUIESCE command and its Time Stamp; plus (vi) Audit Buffer (66) used to note data changes for transfer from disk A1, to disk (A2) and (vii) Data Buffer (67) to accumulate data for transfer from database disk (D1), to (D2).

Now referring to FIG. 3, a diagram illustrating the database system processes is seen in more detail. There is shown a Tracker program 50, a DMUTILITY program 51, and an RDBSupport library 52 within the database system 22 of secondary server 18. The DMUTILITY program 51 issues the QUIESCE command (block 52G), and then proceeds to force two control points (block 52F). The Tracker then automatically continues operation at 52H. The Tracker program 50 checks the status of the QUIESCE to see if it is needed at block 52E. The secondary host Tracker task is "suspended" while Read access is allowed to the secondary host database copy 23 (D2) until a database utility "RESUME" command is entered at the secondary host (block 52D). The QUIESCE is then complete at block 52C.

In FIG. 3 there also exist global events such as the QUIESCE resume (block 52I), QUIESCE complete (block 52J), and QUIESCE request (block 52K) events. Within the Support Library 52, there also exists a wait and reset function (block 52A).

Figure 4:
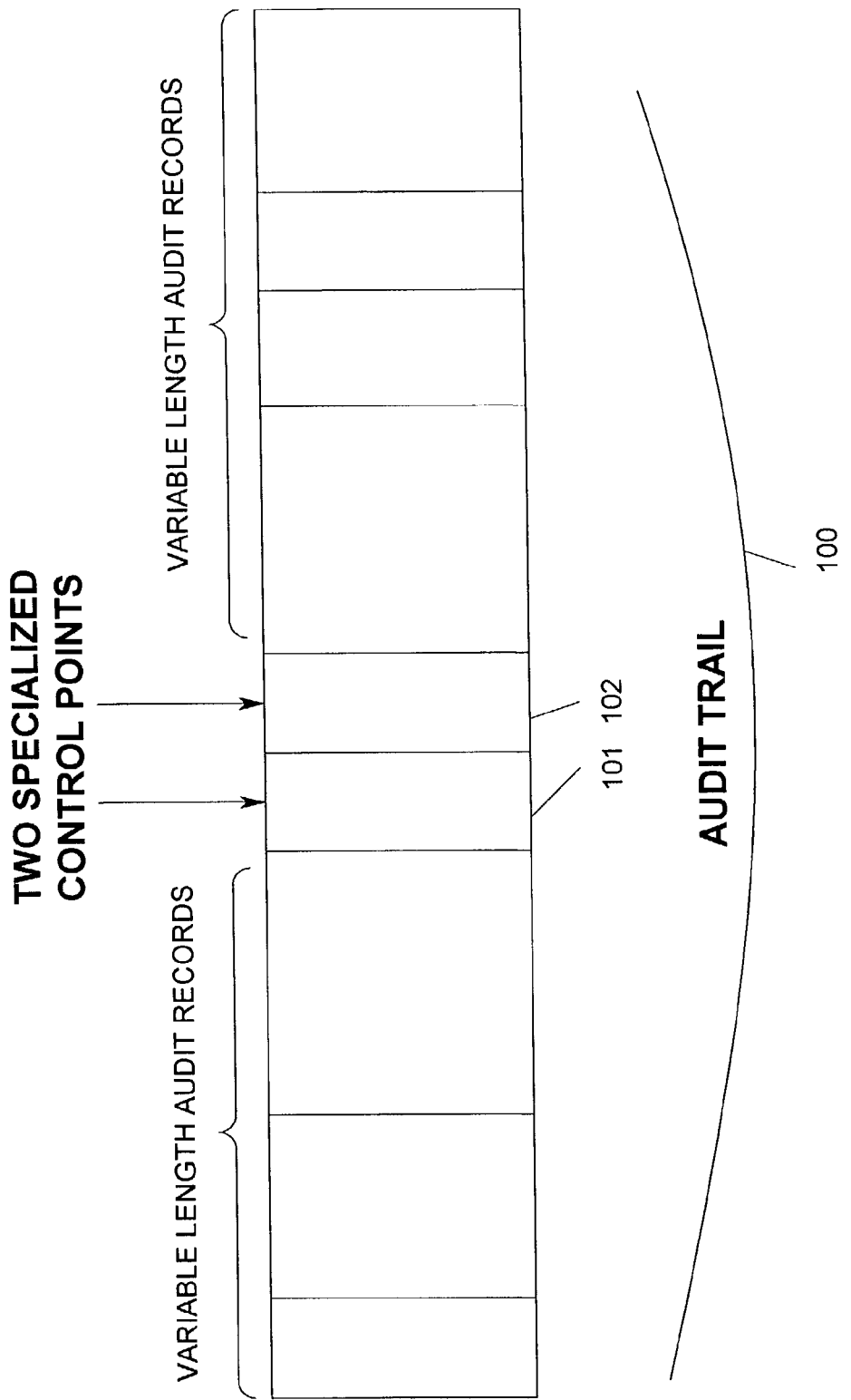
FIG. 4 is a drawing illustrating the audit trail containing two specialized control points to separate audit records.

Referring to FIG. 4, a diagram illustrating a portion of audit files residing (in FIG. 2) at disks 15, (A1) and 24 (A2). The audit trail 100 shows separate audit records, and illustrates the images that the Tracker program actually reads. Within this audit trail 100, there is inserted two specialized control points 101, and 102, which are constructs used to limit the number of audit records which must be reprocessed in the event of a system failure by simultaneously flushing all data buffers from memory to disk 16 (D1). The control points will sectionalize each group of records with a time stamp so that records that were missed can be located and reprocessed.

Figure 5:
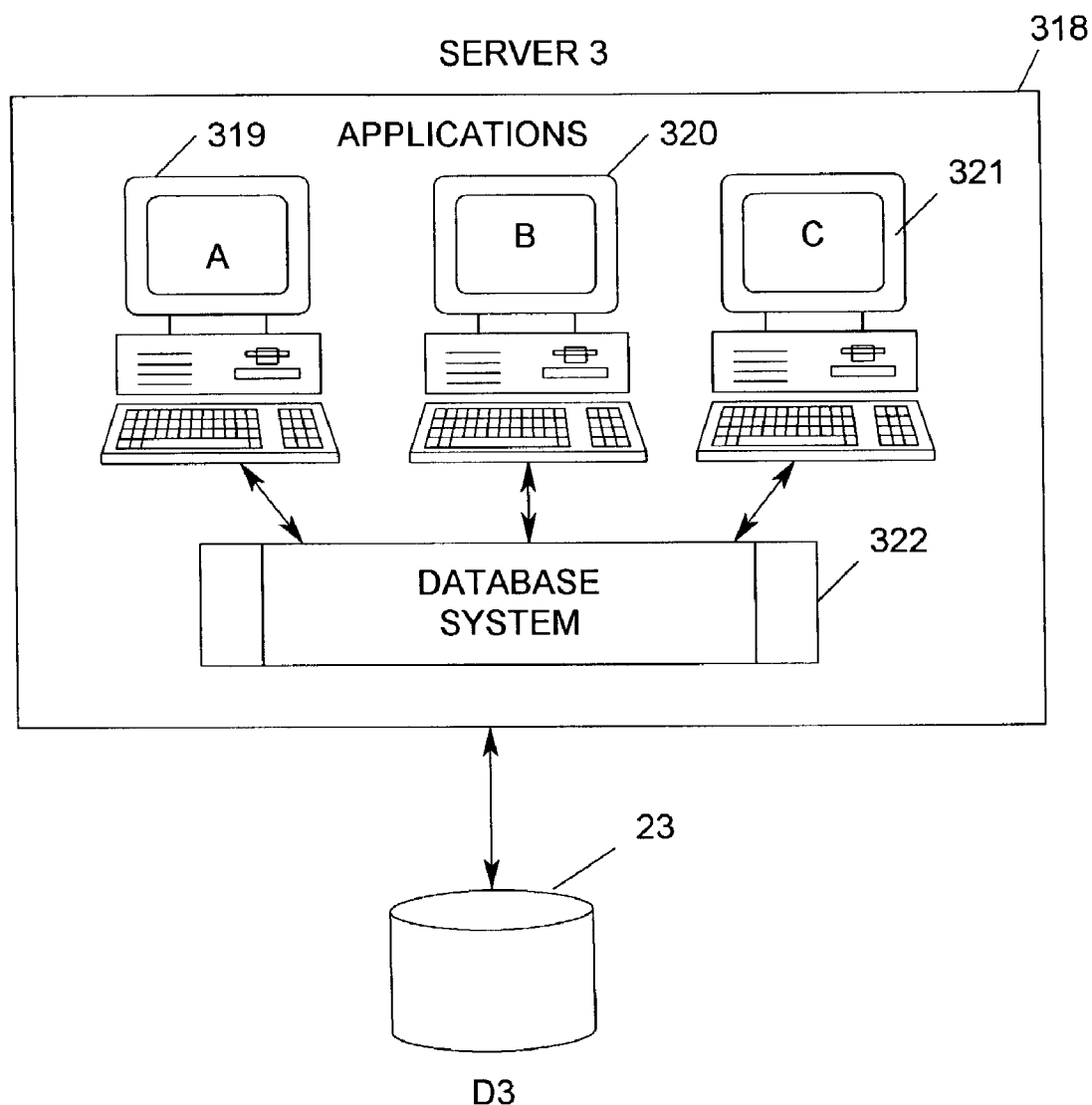
FIG. 5 is a drawing of a tertiary server-database system which can utilize the auxiliary database copy D3 of FIG. 2.

FIG. 5 is a drawing showing a third or tertiary server 318 having, for example, three user applications 319, 320, 321, which utilize a Database system 322. The Database system 322 is connected for access to the database disk module 23 (D1) of FIG. 2. In this fashion, the auxiliary database 23 (D3) of FIG. 2 can now supply information to the tertiary server 318 without disturbance to the operations of the primary and secondary servers.

Described herein has been a method and system for enabling primary and secondary servers and database systems to remain actively online continuously even while transferring audit data from primary to secondary to maintain consistency. Further, an auxiliary database is continuously mirrored from the secondary backup database to provide an extra consistent database available for certification, for data warehousing, for emergency backup or for use of a tertiary server system.

While one embodiment of the invention is illustrated herein, other applications and versions of the invention can still be considered within the scope of the attached claims.

What is claimed is:

1. A program embedded in a tangible medium for operating a system for enabling continual database access to client-users in a primary server-database means with primary database means and client-users in a secondary-server database means connected through a bus means wherein said secondary-server database means provides a secondary backup database means which replicates said primary database means, said system comprising:
    (a) means to maintain physical data consistency between said primary database means and said secondary backup database means;
    (b) means to momentarily suspend said primary database means in order to utilize control points enabling updating transmission from said primary database means to said secondary database means for keeping consistency between said databases;
    (c) means to lift said temporary suspension of primary database access;
    (d) means to mirror said secondary backup database (25) onto a secondary auxiliary mirrored disk copy (23);
    (e) means for utilizing said auxiliary mirrored disk copy as an auxiliary backup database, said means including:
        (e1) means for connecting said auxiliary mirrored disk copy to a tertiary server means to provide a concurrent database for said tertiary server means.

2. An online transaction system for enabling continuous database operations in a network of primary and secondary server means wherein said primary server means holds a primary database means and said secondary server means holds a secondary database means, and whereby said secondary server means maintains a physically consistent backup database means which replicates said primary database means and wherein said primary and secondary server means includes a Tracker program for regulating synchronization of audit files between said primary and secondary database means, a database utility program which utilizes a QUIESCE command to freeze use of a database means when audit files are used to update a database and which initiates a RESUME command to unfreeze a database and includes a Control File utilizing a control point routine to write audit files to disk at regulated intervals, said system comprising:
    (a) means to transmit audit files from said primary database means to said secondary database means on an immediate on-going basis;
    (b) means to momentarily suspend (QUIESCE) access to said primary database means;
    (c) means to transmit, from said primary database means to said secondary database means, using a Remote Database Backup (RDB) audit transfer mechanism, all available audit file data;
    (d) loading a Control File at said secondary server means to show the suspended status of QUIESCE and an added Time Stamp;
    (e) suspending said Tracker program at said secondary database means until a RESUME command is initiated from said database utility program;
    (f) utilizing said database utility program to manage said QUIESCE and RESUME operations;
    (g) mirroring means, at said secondary database means, for making an auxiliary copy of said secondary database means;
    (h) means to utilize said auxiliary database copy as a data source for a third server means.

3. In a transaction processing network having primary and secondary server means wherein each said server means has multiple client-users with specialized utility commands, and wherein said primary server means has a primary database means and said secondary server means has a secondary database means which replicates said primary database means and each database means utilizes a database support library, a Tracker Task program, audit buffer and data buffer disk modules, a Control File for creating control points and wherein said secondary database means provides a secondary remote disk (25) which is physically consistent with said primary database means, and which provides an auxiliary disk module (23) which mirrors a secondary disk file (25) in said secondary database means, a method for enabling continuous updating in said primary server means while still maintaining consistency in said secondary database backup means, said method comprising the steps of:
    (a) initiating a QUIESCE command by a DMUTILITY program at said secondary server means;
    (b) transmitting of a QUIESCE request, by said database support library at said secondary server means, to said primary server means;
    (c) waiting, by said primary database means, for all active/update transactions to complete;
    (d) suspending any transactions on said primary database means;
    (e) flushing of said primary data and audit buffers to said primary data and audit disk modules;
    (f) creating, by said primary server means of two control points in said primary audit file which establish a freeze period for transfer of audit and data information to said secondary database means;
    (g) sending, to the secondary database means audit images and said two control points;
    (h) reading and applying, by said secondary Tracker program, of audit images to the secondary database means;
    (i) writing said secondary data buffers to said secondary disk module (25) when said Tracker Program encounters said two control points;
    (j) inquiring if there are two control points for its QUIESCE command, and if YES, then;
    (k) writing the QUIESCE status and TIMESTAMP to the Control File at said secondary database means;
    (l) suspending operation of said Tracker Program at said secondary database means until receipt of a RESUME command.

4. The method of claim 3 wherein step (i) includes the steps of:
    (i1) mirroring said secondary disk module (25) to create an auxiliary database backup disk module (23);
    (i2) connecting to said auxiliary database backup disk module to provide a backup database if the secondary database should fail.

5. In a network wherein a local primary server means (10) has bus connection (17) to a remote secondary server means (18), and each server means includes a primary and secondary multiple client-users communicating respectively with primary (14) and secondary (22) database means, said primary database means having audit buffers holding an audit trail of audit records and data buffers working with primary disk audit (15) and primary disk data (16) modules, said secondary database means having audit buffers and data buffers working with respective secondary disk audit module 24 and secondary disk data module (25), wherein each database means includes a Tracker Task program for regulating synchronization of audit files between said primary and secondary database means, an access routines program for creating, modifying and deleting data in said database means, a control point routine to write audit files to disk at regulated intervals, a database utility program to manage the physical database, a QUIESCE command which freezes use of a database when audit files are being used to update that database, a method for capturing a snapshot of data from an on-line transaction processing system which enables continual update operations in said primary server means while establishing a backup database at a remote location, comprising the steps of:

(a) creating a physically consistent remote secondary backup copy at said secondary disk data module (25), of said primary disk data module (16) and including the steps of:
    (a1) utilizing said bus connection (17) to download said primary audit files (15) to said remote secondary database means (22) to load said audit files of disk module (15) respectively onto a secondary audit disk module 24;
    (a2) executing a Tracker Task program at said secondary database means to update said secondary data disk module (25);
  (b) developing a mirrored auxiliary copy (23) of said secondary data disk module (25) which includes the step of:
    (b1) utilizing a disk mirroring system to copy said secondary data disk module (25) to produce an auxiliary secondary disk module (23) which is available for an auxiliary server (318);
  (c) splitting off said mirrored auxiliary copy from said secondary data disk module (25) for utilizing said mirrored auxiliary copy by an auxiliary server (318), and including the steps of:
    (c1) applying two control points to the audit trail of audit records in said secondary audit disk module (24);
    (c2) utilizing said Tracker Task program to read the said two control points;
    (c3) writing all of the secondary data buffers to said disk module (24);
    (c4) utilizing said database utility program at said secondary server means (18) to institute a QUIESCE command to temporarily suspend said Tracker Task program but still permitting Read Access to said secondary database backup copy at said data disk module (25).

6. The method of claim 1 which includes the step of:
  (d) applying a RESUME command to said secondary server means which removes the QUIESCE state from said secondary backup copy.

7. A network utilizing a primary database system and secondary database backup system each supporting multiple client users, said secondary database backup system for capturing a physically consistent mirrored snapshot on a disk module (23) of an online secondary database backup system (22,24,25,17) which is consistent with said primary database system, thus eliminating the need to suspend updating operations in said primary database system and to increase database availability for said multiple client-users of said primary database and said multiple client-users of said secondary database backup system, comprising:

(a) a primary server means (10) including:
    (a1) primary multiple client-users (11, 12, 13) utilizing applications accessing data from said primary database system wherein one (13) of said client-users provides a DMUTILITY program for exporting QUIESCE commands to an Audit Trail;
    (a2) said primary database system including:
      (a2a) a primary data disk module (16) for holding updated data files;
      (a2b) a primary audit disk module (15) for holding audit data which records all changes made to said primary database system;
      (a2c) Accessroutines program means for creating, modifying, or deleting data in said primary database system;
  (b) a secondary server means including:
    (b1) secondary multiple client-users (12, 20, 21) utilizing applications accessing data from said secondary database backup system (18);
    (b2) said secondary database backup system (18) including:
      (b2a) a data disk module (25) for holding data files for said secondary multiple client-users;
      (b2b) an audit file disk module (24) for recording changes to data made in said primary data disk module (16) as transmitted from said primary server means to said secondary server means;
      (b2c) an auxiliary data file disk module (23) which provides a mirrored copy of the files in said secondary database disk module (25) which connects a disk mirroring system (26) to said auxiliary data file disk module (23);
      (b2d) Remote Support Library means in said secondary database backup system for receiving a QUIESCE command in order to then send a message to said Accessroutines program which will write two control points to the audit files (15,A1) and (24,A2);
  (c) Secondary Tracker Task means for reading the two control points from said Audit Trail and including:
    (c1) means to write all data buffers to their respective disk modules;
    (c2) writing a QUIESCE status and QUIESCE TIMESTAMP to a Control File at said secondary server means (18) until completion of a "Database QUIESCED" signal which terminates the secondary Tracker Task to allow Read access to the secondary database copy (25).

* * * * *